VARIABLE INTENSITY ELECTROLUMINESCENT RADIATION AMPLIFIER

Filed Jan. 22, 1953 2 Sheets-Sheet 1

INVENTOR.
RICHARD K. ORTHUBER
BY
Lockwood, Galt, Woodard, & Smith
ATTORNEYS

VARIABLE INTENSITY ELECTROLUMINESCENT RADIATION AMPLIFIER

Filed Jan. 22, 1953

*INVENTOR.*
RICHARD K. ORTHUBER
*BY*
Lockwood, Galt, Woodard, & Smith
ATTORNEYS

United States Patent Office 3,244,891

Patented Apr. 5, 1966

3,244,891

VARIABLE INTENSITY ELECTROLUMINESCENT RADIATION AMPLIFIER

Richard K. Orthuber, Fort Wayne, Ind., assignor to International Telephone and Telegraph Corporation, a corporation of Maryland Filed Jan. 22, 1953, Ser. No. 332,733
11 Claims. (Cl. 250—213)

This is a continuation-in-part of application Ser. No. 310,773, filed Sept. 22, 1952, now abandoned.

The present invention relates to a device for amplifying or intensifying the level of given radiation, and more particularly to a device for amplifying a radiation image applied thereto. This invention is not limited to radiation within the visible range, but finds particular to utility in an amplifier used for visible radiation and will therefore be considered primarily in connection with the amplification of optical images having vari-colored or black and white patterns.

In general, the present invention contemplates the provision of a projection screen upon which an optical image may be cast, the screen serving to brighten or to intensify the image for clear observation. Thus, it is possible to project a relatively dim optical image in magnified form upon a screen of this invention which is operative to reproduce the image in clearly observable form.

The discovery of an electroluminescent material which, when subjected to an alternating electric field, emits radiation, makes possible this present invention, and such materials are presently undergoing extensive development for such applications as are commonly served by the conventional electric lighting devices such as incandescent bulbs or fluorescent lights. Electroluminescent materials of such character as will function satisfactorily in the present invention are described by Destriau in the 1947 edition, vol. 38 of Philosophical Magazine, on pages 700 to 739, 774 to 793, and 800 to 887. As explained in this article, certain types of materials may be excited to luminescence by the application thereto of alternating or varying electric fields, and a typical material suitable for use in this invention is a copper activated zinc oxide and zinc sulfide mixture as explained by Destriau. By using such materials as the dielectric in, for example, a conventional condenser, the dielectric may be made to luminesce by the application of an alternating potential of sufficient intensity to the condenser plates.

For the purposes of this invention, the electroluminescent material used in this invention may be regarded as possessing two essential natural properties, viz. very low conductivity for the passage of electric D.C. current and luminescence when subjected to an alternating electric field. Included within this property of luminescence, is the fact that the material luminesces in proportion to the magnitude of the field impressed thereon whereupon a field of small potential will produce luminescence of low order whereas an increase in the potential will produce a luminescence of correspondingly increased intensity.

It is therefore an object of this invention to provide a radiation amplifier which receives an optical image, colored or otherwise, and emits a duplicate image of increased intensity or brightness.

It is a further object of this invention to provide an optical image amplifier device incorporating electroluminescent material, which is capable of controlling the strength of an electric field over the electroluminescent material in accordance with the intensity of a ray of light projected onto the device.

It is a further object of this invention to provide a radiation amplifying device which incorporates an electroluminescent element and an alternating electric field-controlling means which varies the strength of the field over the element in response to the intensity of a light pattern projected onto said electric field-controlling means.

It is a still further object of this invention to provide a laminated projection screen capable of reproducing and amplifying an optical image projected thereon, said screen comprising essentially a layer of electroluminescent material which luminesces when subjected to an alternating electric field, a layer of photo-sensitive material having good insulating properties in the dark, and two electrodes which embrace therebetween the two layers, the photo-sensitive layer serving to alter the magnitude of the electric field applied to the electroluminescent material layer in response to and corresponding to the intensity of a ray of light projected onto the photo-sensitive layer.

In accordance with the present invention, there is provided an optical image amplifier comprising a laminated screen construction closely resembling that of a flat parallel plate condenser having a dielectric interposed between the plates for determining the condenser's capacity. Essentially, the screen comprises two transparent, spaced, parallel, plate-like, conductive electrodes which have interposed therebetween two dielectric materials in laminated form, one of these dielectric lamina consisting of a photosensitive semiconductive material which changes resistance or dielectric constant or both when subjected to a change in intensity of light projected thereon, and the other dielectric or insulating lamina consisting of electroluminescent material which emits radiation when subjected to an alternating electric field, such field being present between the two electrodes when the latter are connected to a source of A.C. potential. By reason of the fact that the photosensitive lamina changes resistance when the intensity of a ray of light projected thereon changes, the net value of electric field applied over the electroluminescent lamina is dependent upon the intensity (or resistance of the photosensitive lamina) of the light projected onto the photosensitive lamina.

Also in accordance with this invention, there is provided an optical image amplifier having essentially the same construction as explained in the preceding paragraph whereby colored optical images may be reproduced in brightened form. In addition to the elements used in the embodiment as explained in the foregoing, a color filter in lamina form is superimposed on the screen so to lie in the path of the optical image projected onto the photosensitive material. The electroluminescent layer is thereupon excited in accordance with the intensity of the filtered optical image as it strikes the photosensitive layer, and is thereby caused to emit radiation in accordance with the arrangement of the colors of the projected image.

For a better understanding of the invention, together with other and further objects thereof, reference is made to the following description taken in connection with the accompanying drawings, and its scope will be pointed out in the appended claims.

Figure 1:
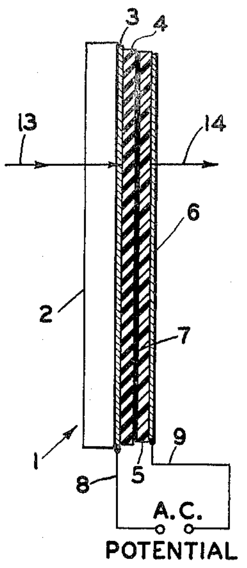
FIG. 1 is a cross section of an embodiment of the present invention.

As seen in the drawings, the present invention is embodied in an amplifier cell of laminated construction in which the laminae, for all practical purposes, are arranged in the manner of an ordinary parallel plate condenser having a dielectric material interposed between the two plates. The laminate constituting the plates of the condenser are composed of electrically conductive materials, such as metal, used in such thin films as to be transparent. The dielectric used between the two electrodes actually comprises two parts, viz., a lamina of photo-conductive material having good electrical insulating properties in the dark and a lumina of electroluminescent material which may be excited to luminescence by the application thereto of a variable electric field.

With reference to FIG. 1, the amplifier cell described in the preceding paragraph, is shown as comprising a plurality of laminations which are much exaggerated in thickness for purposes of convenient disclosure and understanding.

Figure 2:
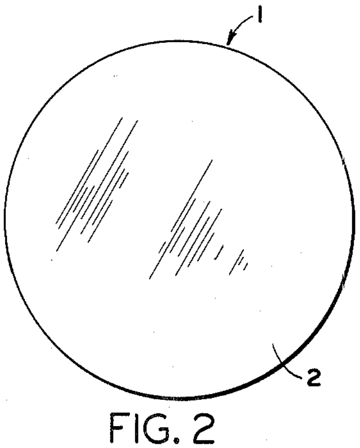
FIG. 2 is a front elevation thereof.

The reference numeral 1 generally indicates a laminated cell made in accordance with the provisions of this invention, and as shown, is made in disc form (see FIG. 2). Obviously, the shape of the cell may be varied to suit the intended purpose; for example, instead of being flat, the cell could be either convex or concave and have either a square or rectangular outline.

As illustrated, the cell 1 comprises a transparent lamina 2 which may be formed of glass, transparent plastic, or other suitable transparent insulating material, the principal function of this transparent lamina being to protect and support the remaining laminae of the amplifier cell and to provide a suitably rigid cell. It is well to mention at this point, that the left-hand face of this reinforcing base 2 is fully exposed to the optical image to be amplified when the cell is in operation, the light rays making up the optical image passing completely through the thickness of the base.

Superimposed on the transparent base 2 is a lamina 3 of transparent metal which may be produced by well known methods of metal evaporation or the like upon the right-hand surface of the base 2. As may be understood from the description thus far, this lamina 3 constitutes one of the two electrode plates, and in order to operate satisfactorily, must be a good conductor in plate-like form, and yet be transparent to the passage of light rays therethrough.

Next, a lamina of photo-conductive material 4 is superimposed upon the electrode 3 and preferably has good insulating properties in the dark while at the same time is photosensitive whereby a variation in the intensity of a ray of light impinged thereon produces a change in electrical resistance between its sides. Suitable materials for this lamina 4 are cadmium sulphide, antimony sulphide, and lead sulphide. It is well to mention, that any one of these named materials may be regarded, as will be more fully explained hereafter, as having dielectric constant and resistance values which vary with the intensity of light projected thereon.

Superimposed on the lamina 4 is another lamina 5 characterized hereinbefore as an electroluminescent lamina. The dielectric or nonconductive material constituting this lamina may vary in composition with design preferences and the uses to which the cell 1 is to be subjected; however, in general such electroluminescent material contains luminescent materials or compounds which, when subjected to a varying or alternating field will radiate illumination which is dependent upon the strength or value of the electric field.

Generally, the better the insulating properties of the electroluminescent material, the better are the results in amplifying an optical image.

Another electrode 6 constituted by a plate-like film of metal like the electrode 3 is superimposed upon the remaining side of the electroluminescent layer 5, and like the electrode 3, is transparent so as to provide the free, substantially uninhibited passage therethrough of light rays.

Preferably, an opaque layer of insulation 7 is interposed between the two dielectric laminae 4 and 5 and its purpose is to prevent the communication of any light between these two dielectric laminae. The purpose of this opaque layer 7 will be further explained hereafter.

Two wires 8 and 9 are connected to the electrodes 3 and 6 respectively for the purpose of applying to the latter a suitable source of A.C. potential, such as 110 volts.

Figure 3:
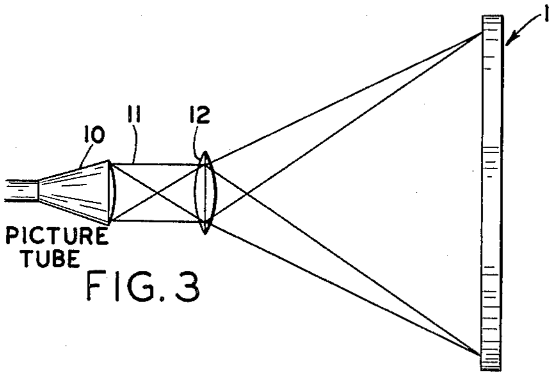
FIG. 3 is a diagrammatic illustration of the use of the present invention in conjunction with a television receiver.

In FIG. 3 is seen a possible use to which the embodiment of FIG. 1 is susceptible. A television picture tube 10 is shown as reproducing an optical image generally indicated at 11, which is magnified by a suitable lens 12 and projected onto the screen 1. The screen 1 transforms the magnified image into a brightened image which appears as being radiated by the side of the screen 1 opposite the lens 12.

Figure 4:
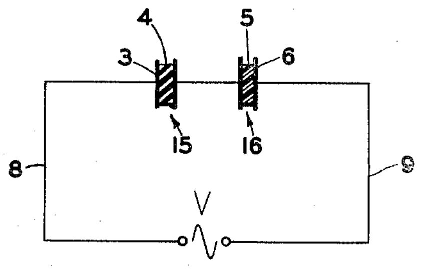
FIG. 4 is an equivalent electrical circuit of the embodiment of FIG. 1.

In considering the operation of the foregoing embodiment, reference should be had to FIGS. 1 and 4, FIG. 4 being an equivalent electrical circuit diagram of the physical arrangement of FIG. 1. Considering first the simplest type image to be amplified, a pin point ray of light, assume that the amplifier cell 1 is contained in a completely darkened space or room, and that a single pin point ray of light is directed onto the front surface of the base 2. Since the base 2 and electrode 3 are transparent, this ray 13 will penetrate both and impinge upon the photo-sensitive layer 4. This layer 4 being both a good insulator and a photoconductor, the ray 13 will produce in the area struck by the ray an elemental section of lowered resistance which corresponds in value to the intensity to the ray 13. Likewise, this same elemental section directly beneath the ray 13 may change its dielectric constant. The other portion of the layer not illuminated will possess the usual high resistance which corresponds to darkness, since the material constituting the layer is an insulator for all practical purposes.

Now if it is assumed that the source of A.C. potential applied to the electrodes 3 and 6 is a constant, the photo-sensitized section of layer 4 will serve to communicate to the adjacent elemental section of the electroluminescent layer 5 a voltage corresponding to the change in resistance and dielectric constant. This change in potential applied to the adjacent section of the layer 5 produces an elemental area of illumination corresponding to the change in potential produced by the lowered resistance in the layer 4. To an observer viewing the front face of the cell 1, the change in potential over the particular energized section of the electroluminescent layer 5 will show as a spot 14 corresponding to the size and intensity of the ray 13. By properly choosing the thicknesses of the layers of dielectrics 4 and 5, and the value of potential applied to the electrodes 3 and 6, the spot of light appearing on the front face of the layer 5 will correspond in size to the size of the spot produced on the layer 4 by the ray 13. An arrow 14 emanating from the layer 5 in FIG. 1 is used to show at relationship between the rays generated by the cell 1 and the energizing ray 13. While a pin point pattern of light has been used in the foregoing explanations, it is obvious that an optical image of complex design will be reproduced in the same manner.

The theory of operation may be more fully understood by reference to the equivalent circuit diagram of FIG. 4. Assuming that the same ray 13 penetrating a darkened space in which the cell 1 is contained is again used, the two condensers 15 and 16 represent the energized elemental sections of the cell laminae 4 and 5 respectively. The condenser 15 is constituted by the electrode 3 and the dielectric layer 4, and the condenser 16 is constituted by the dielectric 5 and the electrode 6, the connecting portion between these two condensers 15 and 16 being the contiguous surfaces of the two layers 4 and 5.

Considering that the cell 1 is in a completely darkened room or space, and the voltage V is applied to the electrodes 3 and 6, a voltage division across the two elemental condensers 15 and 16 of equal value may be assumed to exist. These values may be represented by the formula $V/2$. Since these condensers 15 and 16 are connected in series, a change in dielectric constant of the dielectric material 4 or 5 will produce a change in voltage division across the two condensers, the sum of the two voltages appearing across the condensers 15 and 16 always equalling the given valve V.

By decreasing the dielectric constant of the photoconductive layer 4, it is seen that the capacity of the condenser 15 is increased. This results in a voltage division between the condensers 15 and 16 in which the voltage appearing across the condenser 15 is lower than that across the condenser 16. The dielectric or nonconductive material 5 in the condenser 16 being electroluminescent, it correspondingly follows that this material will be excited in accordance with the increase in magnitude of the electric field impressed thereover. Thus it is seen, that the ray 13 impinging upon the photosensitive layer 4 serves to decrease the dielectric constant of this layer and to effect a rearrangement of the distribution of potentials across the two condensers 15 and 16, the voltage across the condenser 16 being raised whereupon the electroluminescent layer 5 is excited to produce luminescence corresponding to the change in dielectric constant of the layer 4.

While the foregoing theory has assumed that the controlling voltage applied to the condenser 16 results as a change in the capacity of condenser 15 occurs, it may be said that this theory explains one embodiment of this invention. Another embodiment of this invention comprehends the fact that the photoconductive layer 4 changes in resistance when it is subjected to a ray of light which changes in intensity. Thus if the condenser 15 is considered as a resistor which changes in value in proportion to the change of intensity of a ray of light impinged thereon, the effective value of voltage impressed across the condenser 16, or in other words across the electroluminescent layer 5, would be directly affected thereby.

Thus two concepts are embodied in this invention, the one of division of voltages across two capacities, one of which varies with the variation in intensity of light projected thereon, and the other a variation in voltage over the electroluminescent layer which is dependent upon the resistance of the controlling layer as it is changed by a variation in intensity of a ray of light projected thereon.

The opaque lamina 7 is used in between the photoconductive and electroluminescent laminae as a light shield which prevents the luminescence of the lamina 5 from impinging on lamina 4 which, if allowed to occur, would further effect resistance or dielectric constant changes in the lamina 4. A cell without lamina 7 may be characterized as a light-feedback device which would produce a quantity of light upon initial excitation corresponding to the natural generating limits or saturation of the materials constituting the laminae.

For some applications of the present invention it will be preferred to eliminate the opaque layer, and whether or not it is used will depend upon the designer's preference.

It is possible to obtain stable operation of the amplifier just described for reproducing accurately an image without using the opaque lamina 7. This is accomplished by proper selection of the materials composing the respective photo-sensitive and electroluminescent layers whereby the photo-sensitive layer will be excited by radiation lying in a different spectral range than that of the radiation produced by the electroluminescent layer. Thus, if the photosensitive layer responds only to X-rays, ultraviolet or infra-red rays, and the electroluminescent layer emits visible light only, it is seen that the excitation of the electroluminescent layer will not effect any cumulative change between the two layers. With total or partial coincidence in the spectral response ranges for both of these layers, it will occur by reason of the optical feedback explained in the foregoing that the light output of the electroluminescent layer will build up to saturation value which would be independent of the intensity of the initially projected light. However, as explained previously, by the use of a light shield, such as the lamina 7, between the two layers 4 and 5, the saturation effects produced by overlapping ranges can be successfully avoided.

In another arrangement of this invention, the optical feedback between the layers 5 and 4, respectively, may be utilized for increasing the sensitivity of the amplifying screen. Thus, it is possible to eliminate the opaque layer 7. This utilization of the optical feedback is dependent upon the inherent time lag in the response of photosensitive materials, such as photoconductors, to changes in impinging illumination. It is known that the internal photo current generated in photoconductors by sudden application of a square wave light pulse does not instantaneously follow the leading edge of the light pulse. If this light pulse is feedback light from the electroluminescent layer, it follows that a period of time will be required before the regenerative action reduces the impedance of the photoconductor to its minimum value and the electroluminescent material correspondingly emits its maximum brightness. It is therefore possible to prevent the composite screen from reaching a saturation brightness by applying the alternating electric field in phased pulses, with the duration of each electric-field pulse being shorter than the time required for building up to the saturation brightness under highest light illumination conditions. During the occurrence of each of these electric-field pulses, optical feedback between the photosensitive and electroluminescent layers is allowed to occur, but just prior to this feedback reaching its maximum value, the exciting electric-field pulse is removed, and is cut off for a period long enough to enable the photosensitive layer to return to its fundamental or dark resistivity characteristic. Therefore, the electric-field pulse frequency and duration of the electric-field pulse must be adapted to the build-up and decay-time constant of the photosensitive layer. In most instances, the electroluminescent materials respond with negligible time delay to changes in the exciting field, but in the situations where the response is not sufficiently rapid, the parameters of the exciting field must be adapted to both response characteristics of the photosensitive and electroluminescent materials, respectively.

It will now appear by use of the foregoing intermittent or pulsating electric field, the composite screen may be so arranged as to emit an amplified image from either side of the screen. Where the picture is emitted from the side which receives the incident light (FIG. 1), the electrode 6 may be made of opaque material. Also, depending upon the performance desired, it is permissible to arrange oppositely the photosensitive and electroluminescent layers from that illustrated in FIG. 1. When the image to be amplified is projected upon the left side of the composite screen of FIG. 1, the reradiated amplified image emitted from this same side must pass through the photosensitive layer 4. Thus this layer must be transparent, but if this is not possible for the photosensitive material selected, the positions of the two layers 4 and 5 may be reversed, since the electroluminescent layer may be formed in transparent thicknesses.

Figures 5, 6, 7:
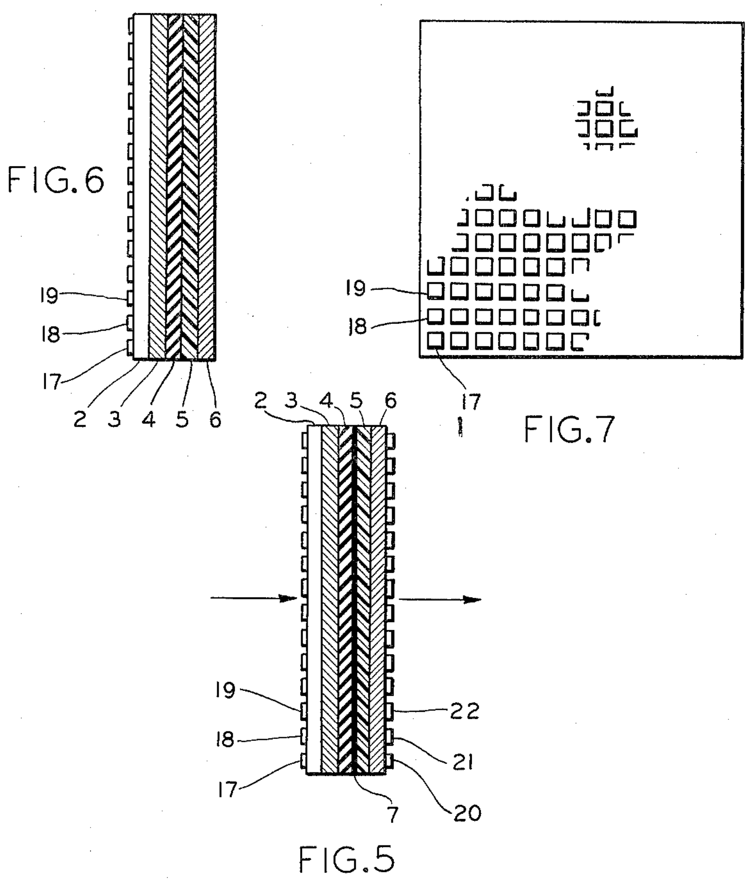
FIG. 5 is a cross section of another embodiment of this invention which serves to reproduce an image in color.
FIG. 6 is still another embodiment for reproducing a color image.
FIG. 7 is a front elevation of either of the embodiments of FIGS. 5 and 6.

With reference now to FIGS. 5 to 7, a composite screen substantially identical in construction to the screen of FIG. 1 serves to reproduce color images. The difference between this screen and the one of FIG. 1 resides in the use of color filters applied to the left and right sides, respectively, of the screen. These filters (shown in exaggerated form in the drawings) may be in mosaic form and superimposed on the left and right sides, respectively, of the screen. The filter applied to the left face of the screen may comprise red, green, and blue elemental areas randomly or regularly arranged, and in one arrangement, may comprise a series of parallel strips of color extending from one side of the screen to the other.

In the preferred arrangement, whatever pattern used in the filter lamina on one side of the screen is duplicated on the other side of the screen whereby a ray of light normal to the plane of the screen will penetrate an elemental area of one filter color and ostensibly be emitted from an elemental area of the same color on the other side of the screen. As seen in FIG. 5, the elemental areas of the projection side of the screen designated by the reference numerals 17, 18 and 19 may be assigned the colors of red, green and blue, respectively, while the corresponding elemental areas on the projecting side, designated by the reference numerals 20, 21 and 22, will have the same colors, respectively.

In considering the operation of the color screen of FIG. 5, projection of the image to be amplified occurs from the left, and observation of the amplified picture occurs from the right. If only red light is trained on the screen, it is seen that it will penetrate, preferentially, the red elemental area 17 and serve to excite more vigorously the photosensitive layer 4 in the elemental vicinity directly beneath the area 17. Since the intensity of illumination on the layer 4 is greater in the elemental areas directly beneath the red filters (area 17) maximum excitation and luminescence of the adjacent elemental areas of the electroluminescent layer 5 may be expected. The adjacent elemental red filters or areas 20 on the right face of the screen will now characterize the areas of maximum luminescence to correspond with the preferentially filtered area of incident red light.

It is thus seen that a vari-colored optical image projected on the left side of the screen, will be accurately reproduced in color by the right side of the screen, the adjacent elemental areas of all of the laminae which lie in straight line registry being, as explained in the foregoing, preferentially responsive to particular colors.

For a screen arrangement whereby the amplified image is radiated from the same side of the screen which receives the weak image, reference is made to FIG. 6 in which the screen may be constructed identically to that of FIG. 5 with the exception of the elimination of the color filter lamina 20, 21, 22. Electrode 6 in this instance may be constructed of opaque material, since it is not necessary for light to penetrate therethrough. Since the screen is illuminated from the left, and reradiates the intensified image to the same side, it is necessary that the photosensitive layer 4 be transparent enough to permit the reradiated light from the luminescent layer 5 to pass therethrough. Assuming illumination in the spectral range, it is seen that the major portion of this light will be transmitted through the blue filter areas corresponding to the area bearing the reference numeral 19. The conducting characteristics of the elemental areas of the photosensitive layer 4 lying directly beneath the blue filter areas will now change more rapidly than the elemental areas lying beneath the other filter areas, and by applying the pulsating alternating electric field, as explained previously, the corresponding electroluminescent elemental areas will now be excited to a greater extent than the areas excited by the light passing through the green and red filter areas. The light emitted from the electroluminescent areas will now pass back through the same blue filter areas. Now if a mixture of colors is contained in a light pattern projected from the left face of the screen, it is seen that an identical color pattern will be emitted from this same side of the screen, in amplified form.

A further arrangement for the amplification of a color image is possible by utilizing the previously mentioned principle of using materials in the photosensitive and electroluminescent layers which respond to or radiate, respectively, radiation in different spectral ranges. Taking the example of the photosensitive layer being sensitive only to ultra-violet radiation and the electroluminescent layer radiates only visible light, suitable filters which pass different portions of the ultra-violet band may be used in the incident filter lamina 17, 18, 19 (FIG. 6). By using three elemental filters, as in the case of elemental filters 17, 18 and 19 of FIGURE 6, which pass discrete portions of the ultra-violet band, each of these filters may be made to correspond to a color such as red, green, or blue. Thus the image to be amplified may be constituted of ultra-violet light only, and the lower, intermediate, and upper range of ultra-violet frequencies would correspond to red, green, and blue, respectively. The filter on the output side of the screen may be identical to that of the FIGURE 6 so that the visible radiation would be colored.

From the foregoing it will be seen that an important feature of this invention resides in the use of a material sensitive to light for controlling an exciting electric field applied to the electroluminescent element.

With the use of the disclosed embodiment of this invention a large viewing screen in a television projection system may be used without any loss of brightness, and possibly with material increases in brightness. It is possible to use a relatively small cathode ray tube to obtain on the viewing screen an optical image of desired size. Consequently, the present invention can provide appreciable reductions in the cost of necessary television projection tubes.

While the disclosed embodiment has been explained as having particular value in conjunction with television systems, it obviously may be used in a motion picture projection system, thereby permitting the use of a much smaller projection lamp without any ultimate reduction of brightness of the viewed image. Many other advantages and uses will occur to persons skilled in the art.

What is claimed is:

1. A radiation amplifying screen in the form of a laminated structure operative to intensify a colored optical image projected thereon comprising a transparent base of insulating material having front and back sides and upon the front side of which an optical image to be intensified may be projected, a lamina of color filters provided on the front side of said base and comprising elemental areas of different colors, a thin transparent lamina of conductive material provided on said back side which serves as an electrode, a lamina of photosensitive material provided on the remaining side of said conductive lamina, said photosensitive material including a material having a variable electrical impedance dependent upon the intensity of light impinged thereon, a lamina of electro-luminescent material provided on said photosensitive lamina, said electroluminescent material having the property of emitting light when subjected to an alternating electric field, another thin transparent lamina of conductive material provided on said electroluminescent lamina and also serving as an electrode, a source of alternating potential coupled to said electrodes, said electrodes when connected to said source of alternating potential producing an electric field over said electro-luminescent lamina which varies in intensity as the impedance of said photosensitive lamina varies, the intensity of said light emission varying in accordance with the intensity of said light impinging on said photosensitive material and with said electric field, and a second lamina of color filters provided on the remaining side of the last-mentioned lamina of conductive material and comprising elemental areas of different colors whereby the light emitted by the screen will possess a colored pattern corresponding to the relative locations of all of said elemental areas.

2. A radiation amplifying system of the character described comprising spaced first and second electrically conductive electrodes, a dielectric body interposed between said electrodes which is comprised of two parts, one part being disposed adjacent one electrode and being constituted by a photosensitive material which has a variable electrical resistance dependent upon the intensity of a ray of light impinging thereon, and the other being disposed in between said one part and the other electrode and being constituted by an electroluminescent material which emits radiation when subjected to an alternating electric field, the intensity of said radiation varying in accordance with said light intensity and said electric field said other part when excited to luminescence emitting radiation which impinges on said one part thereby affecting a change in the aforesaid resistance, a source of pulsating alternating potential connected to said electrodes whereby a pulsating electric field of variable intensity may be applied across said electroluminescent part, the pulsations of said alternating potential having a period corresponding to the period of time it takes for said electroluminescent part to reach saturation by reason of the interaction between both of said parts, and a color filtering element optically associated with both of said parts whereby the aforementioned ray of light will pass through a portion of said element before impinging on said one part and the radiation emitted by said other part will also pass through said portion, said element comprising elemental areas of different colors arranged in such relation as will render a colored pattern corresponding to a colored optical image projected onto said one part.

3. A radiation amplfying device comprising an electroluminescent element made of material which will luminesce when subjected to a varying electric field, said element being a dielectric and nonconductive, first means in circuit with said element for providing an alternating electric field therefor, second photoconductive means in direct contact with said element and interposed between said first means and said element operative to control the magnitude of the electric field applied to said element in response to the intensity of a ray of light impinged on said second means, said photoconductive means being composed of a material having a variable electrical impedance depending upon said light intensity and said electroluminescent element having an intensity of luminescence varying in accordance with said light intensity and field magnitude, said material of said photoconductive means being in direct contact with said electroluminescent element, and color filtering means optically associated with said element and said second means operative to transmit only certain colors of light to said second means and further operative to reproduce colors in a pattern corresponding to the pattern of said certain colors for light emitted by said element.

4. A radiation amplifying device of the character described comprising spaced first and second electrically conductive electrodes, a source of alternating potential coupled to said electrodes, a dielectric body including two parts in direct contact with each other and interposed between said electrodes, one part being disposed adjacent one electrode and including a radiation-sensitive material which has a variable electrical impedance dependent upon the intensity of radiation impinging thereon, and the other part being disposed between said one part and the other electrode and including an electroluminescent material which emits radiation when subjected to an alternating electric field, the radiation emission varying in intensity in accordance with the electric field across said electroluminescent material and said intensity of radiation impinging on said radiation-sensitive material, said radiation-sensitive material being arranged to receive thereon a radiation pattern desired to be amplified and said electroluminescent material being arranged to reproduce said pattern in duplicate form, said radiation-sensitive and electroluminescent materials being in direct contact with each other, said other part being an insulator and nonconductive, and color filtering means disposed adjacent said two parts on the outer sides thereof, the filtering means of said one part including elemental color areas in optical registry with and of the same color as corresponding elemental color areas of said other part.

5. A radiation amplifying system operative to intensify an optical image comprising a transparent base of insulating material having front and back sides and upon the front side of which an optical image to be intensified may be projected, a thin transparent lamina of conductive material provided on said back side which serves as an electrode, a lamina of photosensitive material provided on the remaining side of said conductive lamina, said photosensitive material being composed of a material having a variable electrical impedance dependent upon the intensity of light impinged thereon, a lamina of electroluminescent material provided on and in direct contact with said photosensitive lamina, said electroluminescent material having the property of emitting light when subjected to an alternating electric field, the intensity of said emitted light varying in accordance with the intensity of said light impinging on said photosensitive material and with said electric field, another thin transparent lamina of conductive material provided on said electroluminescent lamina and also serving as an electrode, a source of spaced pulses of alternating potential coupled to said electrodes, said pulses having time intervals therebetween of a duration corresponding to the current-decay time of said photosensitive material and having a period shorter than the time for said electroluminescent material to reach saturation brightness.

6. A radiation amplifying system of the character described comprising spaced first and second electrically conductive electrodes, a dielectric body including two parts in direct contact with each other and interposed between said electrodes, one part being disposed adjacent to one electrode and including a photo-sensitive material which has a variable electrical resistance dependent upon the intensity of a ray of light impinging thereon, and the other being disposed between said one part and the other electrode and including an electroluminescent material which emits radiation when subjected to an alternating electric field, the intensity of said radiation varying in accordance with said light intensity and said electric field, said other part when excited to luminescence emitting radiation which impinges on said one part thereby affecting a change in the aforesaid resistance, and a source of pulsating alternating potential connected to said electrodes whereby a pulsating electric field of variable intensity may be applied across said electroluminescent part, the pulsations of said alternating potential having a period corresponding to but shorter than the period of time it takes for said electroluminescent part to reach saturation brightness by reason of the interaction between both of said parts, said pulsations having time intervals therebetween of a duration corresponding to the current-decay time of said photosensitive material.

7. The method of reproducing an image comprising the steps of applying a source of exciting voltage to photosensitive and electroluminescent phosphor elements which are electrically coupled together, altering the impedance of said photosensitive element to correspondingly alter the voltage applied to said phosphor element, feeding back at least a portion of the luminescence of the excited phosphor element to said photosensitive element to cause a further alteration of the impedance of said photosensitive element, which further impedance alteration causes an alteration in the phosphor luminescence, these alterations from luminescence feedback being cumulative tending to drive the phosphor element to saturation, and periodically terminating the feedback of luminescence to said photosensitive element just prior to said phosphor element reaching saturation by removing the exciting voltage from said phosphor element.

8. The method of reproducing an image comprising the steps of applying a source of exciting voltage to photosensitive and electroluminescent phosphor elements which are electrically coupled together, altering the impedance of said photosensitive element to correspondingly alter the voltage applied to said phosphor element, feeding back at least a portion of the luminescence of the excited phosphor element to said photosensitive element to cause a further alteration of the impedance of said photosensitive element, which further impedance alteration causes an alteration in the phosphor luminescence, these alterations from luminescence feedback being cumulative tending to drive the phosphor element to saturation brightness, and periodically removing said exciting voltage from said elements just prior to said phosphor element reaching saturation brightness.

9. The method of reproducing an image comprising the steps of applying an alternating electric field of predetermined amplitude to photosensitive and electroluminescent phosphor elements which are electrically coupled together, applying a light image of variable intensity to alter the conductivity of said photosensitive element and the voltage applied to said phosphor element in accordance with said intensity, feeding back at least a portion of the luminescence of the excited phosphor element to said photosensitive element to cause a further alteration of the conductivity of said photosensitive element, which further conductivity alteration causes an alteration in the phosphor luminescence, these alterations from luminescence feedback being cumulative tending to drive the phosphor element to saturation, and pulsing said electric field to provide electric-field pulses, each pulse having a duration shorter than the time required for said phosphor element to build up to saturation brightness, and said pulses having a cut-off time between pulses for a period long enough to enable the photosensitive element to return to its dark resistivity characteristic.

10. A radiant energy device compriisng first and second electrically conductive electrodes, a source of alternating potential connected to said electrodes, a dielectric structure interposed between and being electrically coupled to said electrodes, said structure including two parts in direct contact with each other, one part being disposed adjacent to one electrode and including a photosensitive material having a variable impedance dependent upon the intensity of radiation falling thereon, the other part being a nonconductive dielectric disposed between said one part and the other electrode and including electroluminescent material which emits radiation when subjected to an alternating electric field, said photosensitive and electroluminescent materials being in direct contact with each other, said electrodes and said parts being arranged into a panel-like configuration having opposite surfaces, one surface being adjacent to said one part and the other surface being adjacent to said other part, the intensity of said emitted radiation varying in accordance with said intensity of radiation falling on said photosensitive material and with said electric field, color-filtering means operatively associated with both of said surfaces for reproducing from said other part a colored image which is a replica in color of an image projected onto said one part, said color-filtering means including a plurality of elemental areas of different color for both surfaces, the elemental areas for the two surfaces being arranged in identical juxtaposed patterns which are in optical registry.

11. The device of claim 10 wherein said elemental areas are contiguous with said surfaces such that one of said patterns is on one surface and the other pattern is on the other surface.

References Cited by the Examiner

UNITED STATES PATENTS

| | | | |
|---|---|---|---|
| Re. 23,802 | 3/1954 | Sheldon | 250—213 X |
| 2,060,977 | 11/1936 | Deboer et al. | 250—213 |
| 2,322,361 | 6/1943 | Iams | 250—213 |
| 2,374,916 | 5/1945 | Biedermann | 250—226 |
| 2,594,740 | 4/1952 | DeForest et al. | 250—213 |
| 2,605,335 | 7/1952 | Greenwood et al. | 250—213 |
| 2,624,857 | 1/1953 | Mager | 250—213 X |
| 2,650,310 | 8/1953 | White | 250—71 |
| 2,692,948 | 10/1954 | Lion | 250—65 |
| 2,780,731 | 2/1957 | Miller | 250—213 |

OTHER REFERENCES

Destriau: The Philosophical Magazine, seventh series, vol. 38, 1947, pp. 700–739.

RALPH G. NILSON, *Primary Examiner.*

ELI SAX, *Examiner.*